US009603309B2

(12) United States Patent
Becker

(10) Patent No.: US 9,603,309 B2
(45) Date of Patent: Mar. 28, 2017

(54) SINGLE CAM DOUBLE BOW KNOTTER FOR BALER

(71) Applicant: AGCO Corporation, Hesston, KS (US)

(72) Inventor: David A. Becker, Newton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/113,577

(22) PCT Filed: Jan. 21, 2015

(86) PCT No.: PCT/US2015/012276
§ 371 (c)(1),
(2) Date: Jul. 22, 2016

(87) PCT Pub. No.: WO2015/112621
PCT Pub. Date: Jul. 30, 2015

(65) Prior Publication Data
US 2017/0000034 A1     Jan. 5, 2017

Related U.S. Application Data

(60) Provisional application No. 61/930,271, filed on Jan. 22, 2014.

(51) Int. Cl.
*A01F 15/14*    (2006.01)
*A01F 15/04*    (2006.01)

(52) U.S. Cl.
CPC .......... *A01F 15/145* (2013.01); *A01F 15/042* (2013.01)

(58) Field of Classification Search
CPC .............................. A01F 15/145; A01F 15/042

USPC .......................................................... 289/15
See application file for complete search history.

(56) References Cited

U.S. PATENT DOCUMENTS

| 362,696 A | * | 5/1887 | Adams | ................. A01F 15/145 289/13 |
| 372,506 A | * | 11/1887 | Whiteley | ............. A01F 15/145 289/15 |
| 379,494 A | * | 3/1888 | Seiberling | ............ A01F 15/145 289/15 |

(Continued)

FOREIGN PATENT DOCUMENTS

| DE | 102008041120 A1 | 2/2010 |
| EP | 1584227 A1 | 10/2005 |

OTHER PUBLICATIONS

European Patent Office, International Search Report for International Application No. PCT/US2015/012276, mailed on Apr. 8, 2015.

*Primary Examiner* — Shaun R Hurley
*Assistant Examiner* — Bao-Thieu L Nguyen

(57) ABSTRACT

A knotter assembly for a baler allows for two bow knots to be formed per knotter tie cycle using a single drive cam gear and two bill hooks while maintaining needle penetration requirements. The knotter assembly includes a first twine disc driven by a first twine disc drive gear and a second twine disc driven by a second twine disc drive gear. The knotter assembly includes a first bill hook driven by a first bill hook drive gear and a second bill hook driven by a second bill hook drive gear. The knotter assembly also includes a cam gear driving the bill hook drive gears and the twine disc drive gears and a main knotter drive shaft driving the cam gear. A needle is located adjacent the twine discs.

3 Claims, 4 Drawing Sheets

(56) References Cited

U.S. PATENT DOCUMENTS

| | | | | |
|---|---|---|---|---|
| 457,169 A * | 8/1891 | Stark | A01F 15/145 | 289/9 |
| 571,072 A * | 11/1896 | Miller | A01F 15/145 | 289/10 |
| 745,941 A * | 12/1903 | Whittington | A01F 15/145 | 159/28.1 |
| 757,127 A * | 4/1904 | Kellog | A01F 15/145 | 289/9 |
| 773,546 A * | 11/1904 | Clokey | A01D 39/00 | 289/15 |
| 1,972,999 A * | 9/1934 | Kleinschmit et al. | B42B 2/02 | 112/22 |
| 3,101,963 A | 8/1963 | Sullivan et al. | | |
| 3,214,206 A * | 10/1965 | Sullivan | A01F 15/145 | 289/14 |
| 3,298,726 A * | 1/1967 | Francis | B65H 69/04 | 289/2 |
| 3,400,959 A * | 9/1968 | Grillot | A01F 15/145 | 289/11 |
| 3,402,956 A * | 9/1968 | Grillot | A01F 15/145 | 289/14 |
| 3,430,998 A * | 3/1969 | Ralston | A01F 15/145 | 289/14 |
| 3,536,347 A * | 10/1970 | Radford | A01F 15/0858 | 289/2 |
| 3,789,751 A * | 2/1974 | Burford | B65B 27/12 | 100/11 |
| 4,108,062 A * | 8/1978 | White | A01F 15/145 | 100/11 |
| 4,142,746 A * | 3/1979 | White | A01F 15/145 | 100/19 R |
| 4,157,063 A * | 6/1979 | Minke | A01F 15/145 | 100/11 |
| 4,351,551 A * | 9/1982 | Verhulst | A01F 15/145 | 289/10 |
| 4,735,446 A * | 4/1988 | Homberg | A01F 15/145 | 289/10 |
| 4,765,235 A * | 8/1988 | Schrag | A01F 15/148 | 100/3 |
| 5,829,346 A * | 11/1998 | Ast | A01F 15/145 | 100/19 R |
| 7,296,828 B2 * | 11/2007 | Schoonheere | A01F 15/145 | 289/2 |
| 7,752,959 B1 * | 7/2010 | Roth | A01F 15/145 | 100/22 |
| 7,878,557 B2 * | 2/2011 | Eylenbosch | A01F 15/145 | 289/13 |
| 8,590,945 B2 * | 11/2013 | Schumacher | A01F 15/145 | 289/2 |
| 9,226,453 B2 * | 1/2016 | Schoonheere | B65H 69/04 | |
| 9,456,552 B2 * | 10/2016 | O'Reilly | A01F 15/042 | |
| 2009/0250930 A1 * | 10/2009 | Eylenbosch | A01F 15/145 | 289/2 |
| 2015/0097370 A1 * | 4/2015 | Schumacher | A01F 15/145 | 289/1.5 |
| 2015/0272011 A1 * | 10/2015 | Demon | A01F 15/145 | 100/33 R |

* cited by examiner

SINGLE CAM DOUBLE BOW KNOTTER FOR BALER

RELATED APPLICATION

Under provisions of 35 U.S.C. §119(e), Applicants claim the benefit of U.S. Provisional Application No. 61/930,271 entitled SINGLE CAM DOUBLE BOW KNOTTER FOR BALER and filed Jan. 22, 2014, which is incorporated herein by reference.

BACKGROUND OF THE INVENTION

Field of Invention

This invention relates to equipment for binding bales of crop material and the like while such bales are being produced in a baler.

Description of Related Art

Mechanisms for binding bales of crop materials or other substances with strands of twine or wire are well known in the art. Typically, balers are equipped with a knotter that forms a double overhand knot, a single overhand knot, or a single bow knot. Twine pull tests have shown that bow knots are more favorable, with a 10-15% advantage in knot strength. U.S. Pat. No. 3,101,963 illustrates an example of a McCormick bow knotter.

It would be desirable to have a knotter capable of tying two bow knots at the same time on a baler.

OVERVIEW OF THE INVENTION

In one embodiment, the invention is directed to a baler having a knotter assembly configured to take strands of binding material looped around a finished bale and binding the strands with two knots per knotter tie cycle. The knotter assembly includes a first twine disc driven by a first twine disc drive gear and a second twine disc driven by a second twine disc drive gear. The knotter assembly includes a first bill hook driven by a first bill hook drive gear and a second bill hook driven by a second bill hook drive gear. The knotter assembly also includes a cam gear driving the bill hook drive gears and the twine disc drive gears and a main knotter drive shaft driving the cam gear. A needle is located adjacent the twine discs.

The invention is also directed to a method of forming two knots in strands of binding material around a finished bale per knotter tie cycle in a baler with a knotter assembly. The knotter assembly has a first twine disc driven by a first twine disc drive gear, a second twine disc driven by a second twine disc drive gear, a first bill hook driven by a first bill hook drive gear, a second bill hook driven by a second bill hook drive gear, a cam gear driving the bill hook drive gears and the twine disc drive gears, a main knotter drive shaft driving the cam gear, and a needle located adjacent the twine discs. The method includes using the needle to place upper and lower twines across a valley created between first and second twine discs. The first twine disc is rotated to grab the upper and lower twines to move the upper and lower twines into a first tensioner positioned over the first bill hook on a side of the knotter assembly to begin the knot formation. The needle retracts to place the upper and lower twines across the valley again. The method then includes rotating the second twine disc in an opposite direction of the first twine disc to grab the upper and lower twines and pull them into a second tensioner positioned in front of the second bill hook and rotating the two bill hooks around the twines being held by their respective disc and tensioner. The method then pulls the tails of the twine out of the tensioners as the bill hooks finish their rotation and pulls the knots off of the bill hooks by rearward motion of the bale.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

As is known in the art, a baler 10 has a baling chamber 12 within which crop material or the like may be compressed into rectangular bales. A reciprocating plunger moves fore-and-aft within chamber 12 in the usual manner to press successive newly introduced charges of crop material against a previously formed and tied bale to thereby form a new bale. This action also causes both bales to intermittently advance toward a rear discharge opening 14 of the baler.

Figure 1:
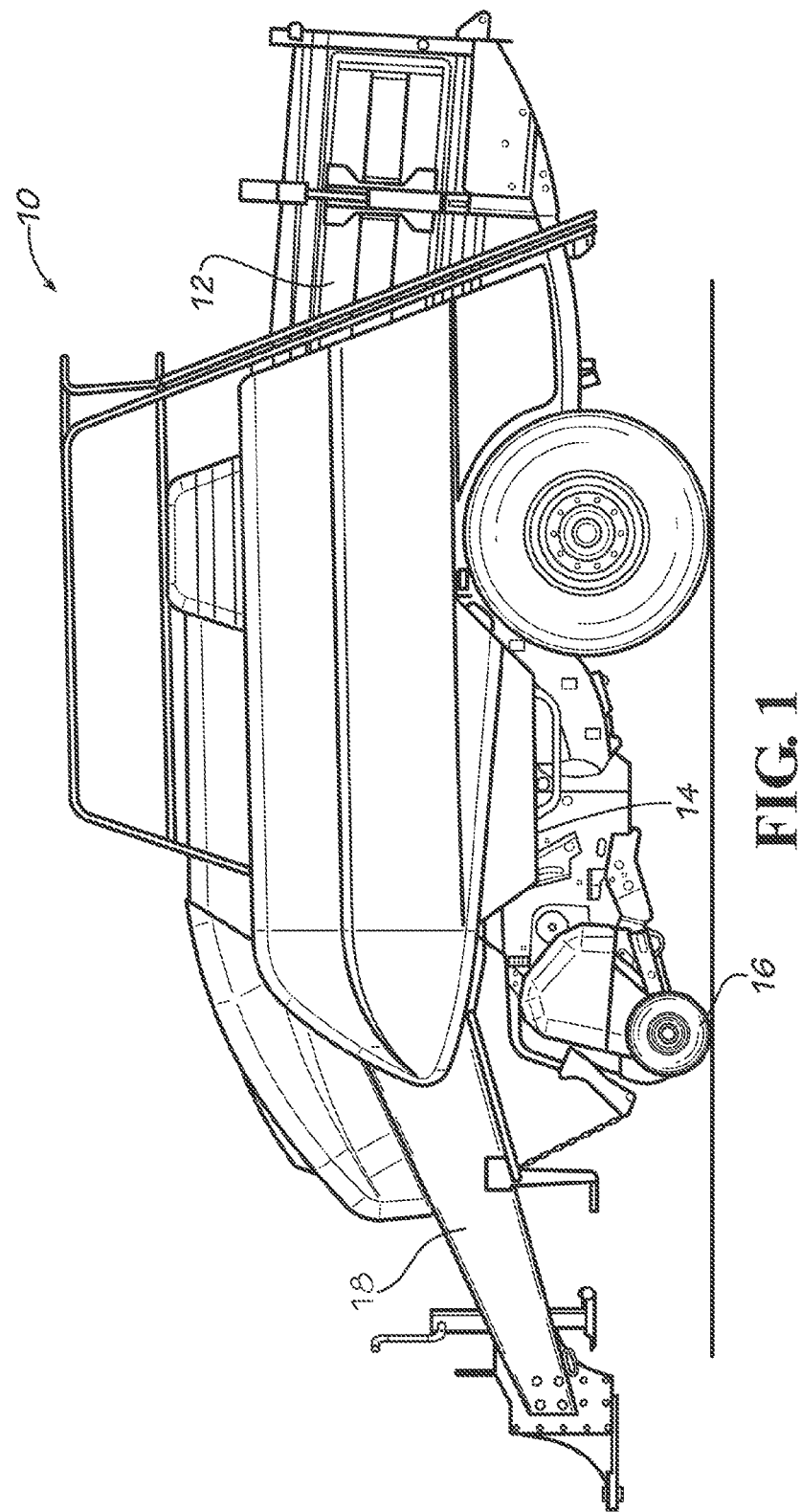
FIG. 1 is side elevation of a baler.

Turning to the figures, wherein like reference numerals represent like elements throughout the several views, FIG. 1 shows a baler 10 with a fore-and-aft extending baling chamber 12 mounted on a baler frame 14 within which bales of crop material are prepared. Crop material is collected with a pickup 16 below and slightly ahead of baling chamber 12 and then loaded up into the bottom of the chamber 12. Baler 10 may be hitched to a towing vehicle (not shown) by a tongue 18, and power for operating the various mechanisms of the baler may be supplied by the towing vehicle, such as the vehicle's power takeoff shaft.

Figure 2:
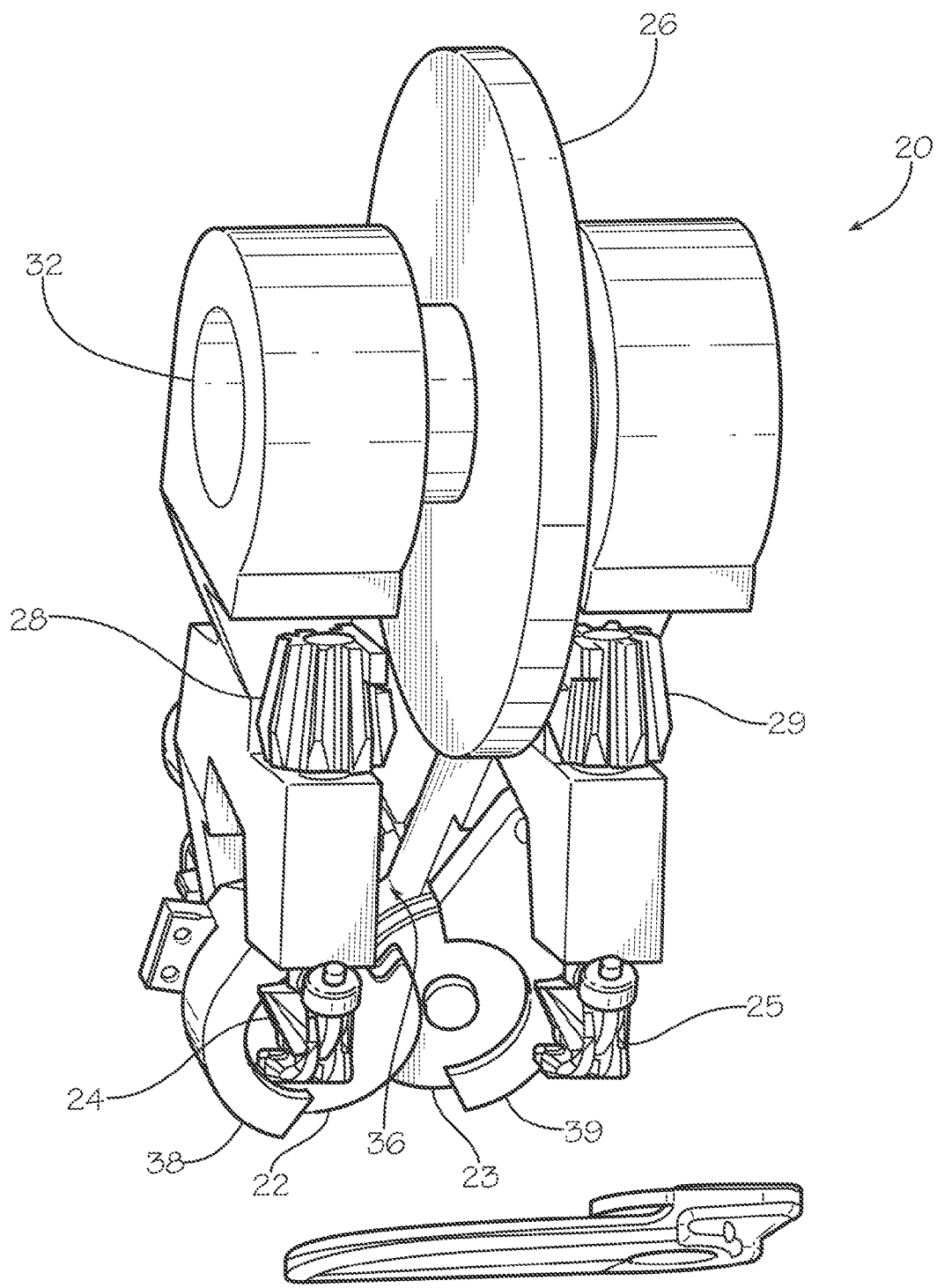
FIG. 2 is a partially exploded perspective view of a knotter assembly for the baler of FIG. 1 in accordance with principles of the present invention.
Figure 3:
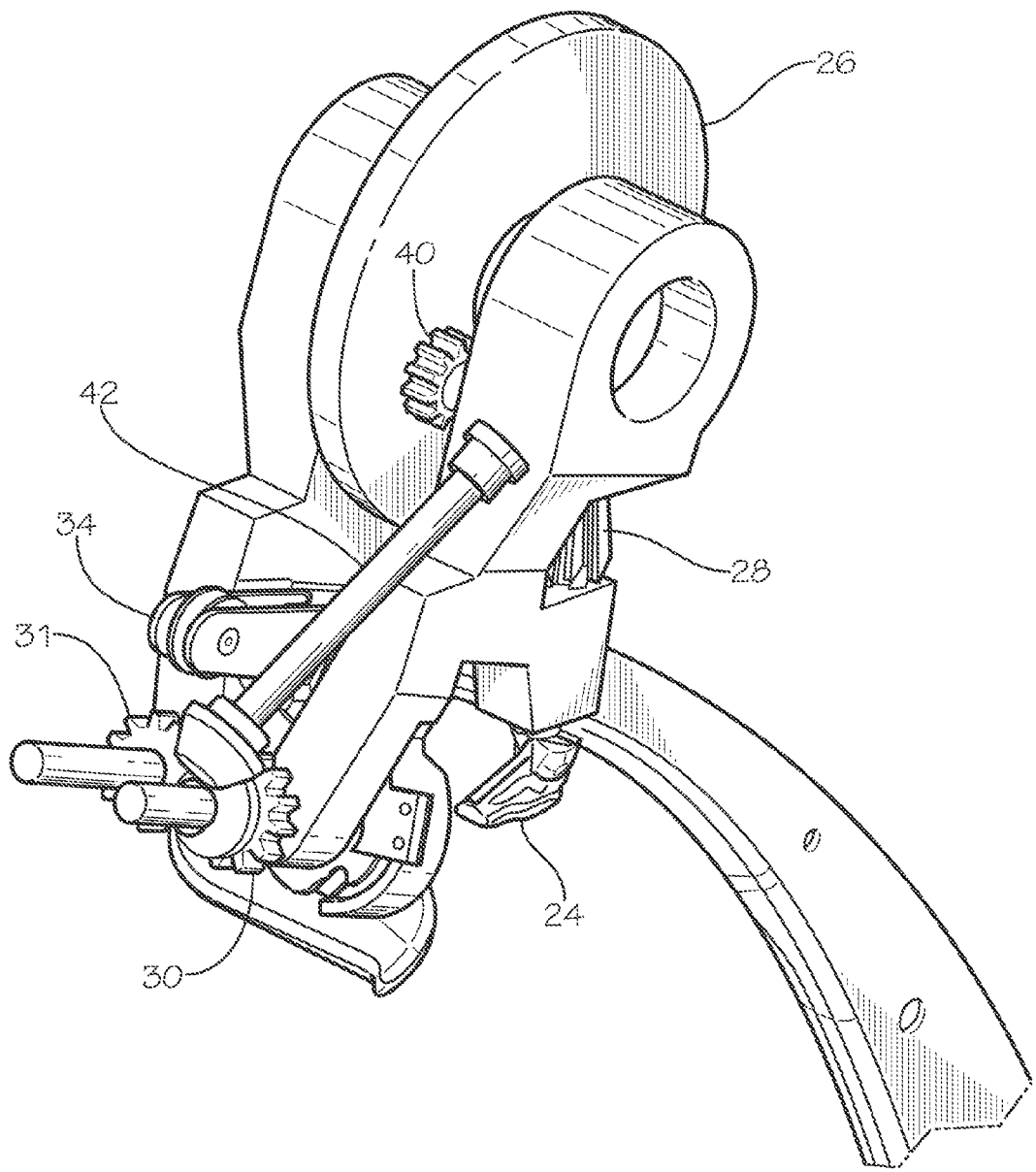
FIG. 3 is another partially exploded perspective view of the knotter of FIG. 1.
Figure 4:
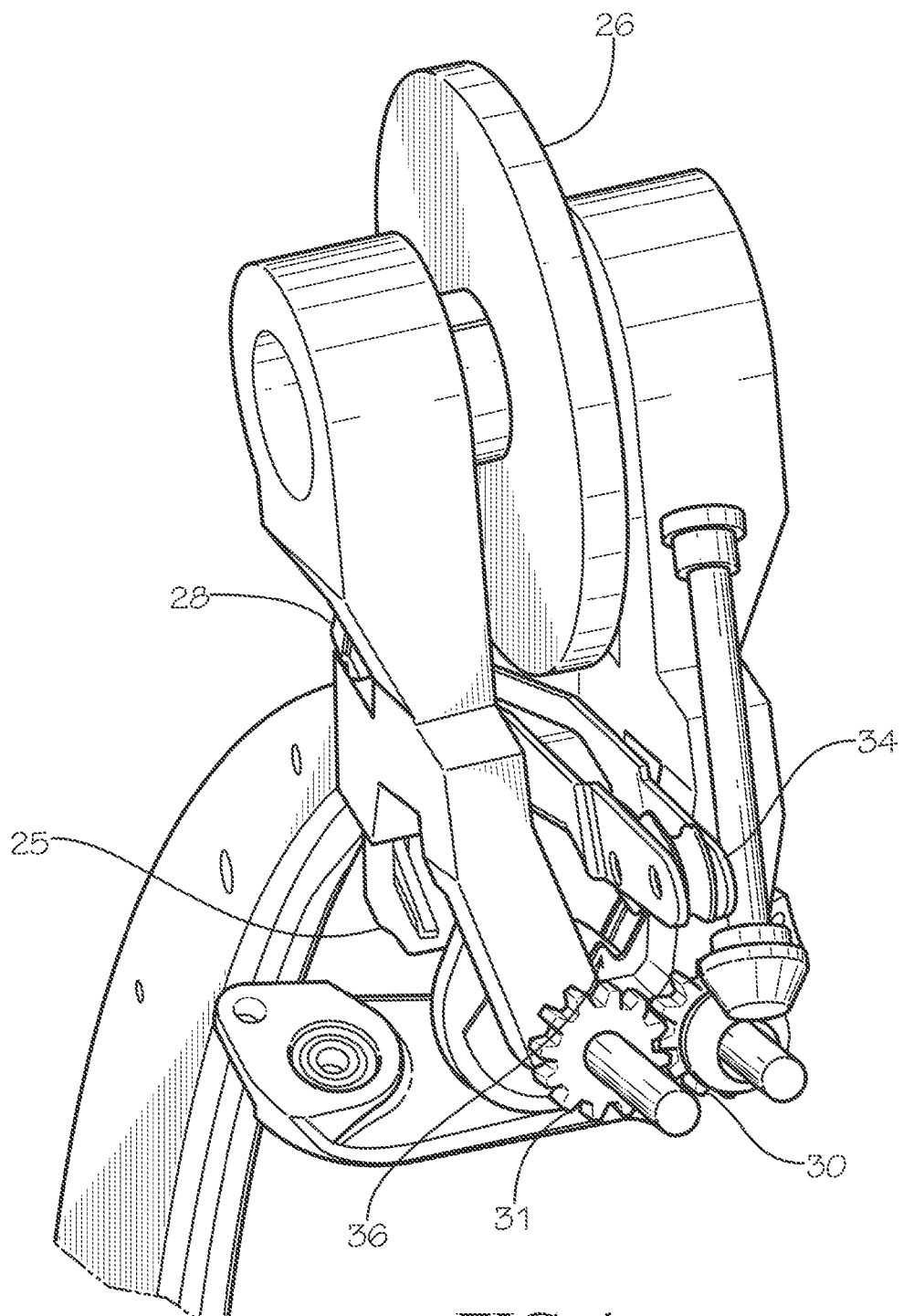
FIG. 4 another partially exploded perspective view of the knotter of FIG. 1.

Turning now to FIG. 2, a knotter assembly 20, which is mountable to the frame 14 of the baler 10, is configured to take strands of binding material looped around a finished bale and bind the strands with two knots. The term "strand" as used herein is intended to mean not only twine made from natural or synthetic fibers, but may also include metallic wire or other strapping material. Desirably, the knotter assembly 20 is in the form of a module that can be bolted in place on the frame 14 of baler 10. In the illustrated embodiment, knotter assembly 20 includes first and second twine discs 22, 23 to position twine for knot formation by first and second bill hooks 24, 25. A single cam gear 26 drives the two twine discs 22, 23 and two bill hooks 24, 25. First and second bill hooks 24, 25 are each attached to a bill hook drive gear 28, 29. Each twine disc 22, 23 is rotated by a twine disc drive gear 30, 31. A main knotter drive shaft 32 drives the single cam gear 26. Desirably, the single cam gear 26 drives the bill hook drive gears 28, 29 with a beveled connection understood by one skilled in the art and drives the twine disc drive gears 30, 31 using a spur gear 40 coaxial with the drive shaft 32 and attached to the single cam gear 26 and pinion drive shaft 42. A needle 34 is located adjacent the twine discs 22, 23. The needle 34 and control thereof may be of conventional design.

When a knotter tie cycle is initiated, the needle 34 places upper and lower twines across a valley 36 created between the two twine discs 22, 23. The first twine disc 22 is rotated to grab the twines, move them into a first tensioner 38 to be positioned over the first bill hook 24 on the side of the knotter assembly 20 to begin the knot formation. When the needle 34 retracts, it will place the twines across the valley 36 once more and the second twine disc 23 is rotated in the opposite direction of the first twine disc 22 to grab the twines and pull them into a second tensioner 39 to be positioned in front of the second bill hook 25. After the twines have reached their tying positions, the two bill hooks 24, 25 rotate around the twines that are being held by their respective disc. As the bill hooks 24, 25 finish their rotation, the twine discs 22, 23 finish their rotation and pull the tails of the twines out of the tensioners 38, 39. The knots are finished and pulled off of the bill hooks 24, 25 by rearward motion of the bales in the chamber 12.

The bill hooks 24, 25 are positioned substantially axial to the main knotter drive shaft 32 and transversely to the operating direction of the baler 10. This orientation allows for needle swing to remain the same as it is on other large square balers which is shorter than the required needle swing if the bill hooks 24, 25 were lined up axial to the operating direction.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A baler having a knotter assembly configured to take strands of binding material looped around a finished bale and binding the strands with two knots per knotter tie cycle, the knotter assembly comprising:
   a first twine disc driven by a first twine disc drive gear;
   a second twine disc driven by a second twine disc drive gear;
   a first bill hook driven by a first bill hook drive gear;
   a second bill hook driven by a second bill hook drive gear;
   a cam gear driving the bill hook drive gears and the twine disc drive gears;
   a main knotter drive shaft driving the cam gear; and
   a needle is located adjacent the twine discs.

2. The baler of claim 1 wherein the bill hooks are positioned axial to the main knotter drive shaft and transversely to the operating direction of the baler.

3. A method of forming two knots in strands of binding material around a finished bale per knotter tie cycle in a baler with a knotter assembly, the knotter assembly having a first twine disc driven by a first twine disc drive gear, a second twine disc driven by a second twine disc drive gear, a first bill hook driven by a first bill hook drive gear, a second bill hook driven by a second bill hook drive gear, a cam gear driving the bill hook drive gears and the twine disc drive gears, a main knotter drive shaft driving the cam gear, and a needle located adjacent the twine discs, the method comprising:
   using the needle to place upper and lower twines across a valley created between first and second twine discs;
   rotating the first twine disc to grab the upper and lower twines to move the upper and lower twines into a first tensioner positioned over the first bill hook on a side of the knotter assembly to begin the knot formation;
   retracting the needle to place the upper and lower twines across the valley again;
   rotating the second twine disc in an opposite direction of the first twine disc to grab the upper and lower twines and pull them into a second tensioner positioned in front of the second bill hook;
   rotating the two bill hooks around the twines being held by their respective disc and tensioner;
   pulling the tails of the twine out of the tensioners as the bill hooks finish their rotation; and
   pulling the knots off of the bill hooks by rearward motion of the bale.

* * * * *